US00RE39765E

(19) United States
(12) Reissued Patent
Robb

(10) Patent Number: US RE39,765 E
(45) Date of Reissued Patent: Aug. 14, 2007

(54) COOLANT MOTOR FAN DRIVE

(75) Inventor: Neil E. Robb, Jackson, MI (US)

(73) Assignee: BorgWarner Inc., Auburn HIlls, MI (US)

(21) Appl. No.: 11/126,377

(22) Filed: May 10, 2005

Related U.S. Patent Documents

Reissue of:
(64) Patent No.: 6,868,809
Issued: Mar. 22, 2005
Appl. No.: 10/855,132
Filed: May 27, 2004

(51) Int. Cl.
*F01P 5/04* (2006.01)
F01P 5/10; F01P 7/16

(52) U.S. Cl. ..... 123/41.47; 165/51

(58) Field of Classification Search ..... 123/41.02, 123/41.08, 41.09, 41.1, 41.46, 41.47, 198 E, 123/142.5 R, 142.5 E; 165/51
See application file for complete search history.

(56) References Cited

U.S. PATENT DOCUMENTS

| | | | | |
|---|---|---|---|---|
| 3,934,644 A | | 1/1976 | Johnston | |
| 4,385,594 A | | 5/1983 | Hauser, Jr. | |
| 4,941,437 A | * | 7/1990 | Suzuki et al. | 123/41.12 |
| 4,976,319 A | * | 12/1990 | Eberhardt et al. | 169/54 |
| 5,013,214 A | * | 5/1991 | Kapich | |
| 5,095,691 A | | 3/1992 | Yoshimura | |
| 5,215,044 A | | 6/1993 | Banzhaf et al. | |
| 6,520,136 B2 | * | 2/2003 | Ito et al. | |

FOREIGN PATENT DOCUMENTS

| | | | |
|---|---|---|---|
| GB | 2 082 317 A | * | 3/1982 |
| JP | 402 019 607 A | * | 1/1990 |
| JP | 409 287 452 A | * | 11/1997 |
| JP | 2002 303138 A | | 10/2002 |

* cited by examiner

*Primary Examiner*—Stephen K. Cronn
*Assistant Examiner*—Arnold Castro
(74) *Attorney, Agent, or Firm*—Greg Dziegielewski, Esq.; Artz & Artz, P.C.

(57) ABSTRACT

The control of the coolant flow is accomplished through valving or by adjusting the pumping speed of a water pump and a water motor, or a combination of all three elements. During normal operation, where engine cooling is not required, the speed control coupling maintains a slow and constant water pump speed at all engine-operating speeds. The valve is maintained to stop coolant flow from entering the radiator while allowing coolant to flow through a heater. If engine cooling is required, the valve is actuated such that coolant is circulated to the engine and through the radiator. If air conditioning is required, the speed control coupling simply increases the water pump speed and the fan speed while the valve is set to bypass coolant flow to the engine. If air conditioning and engine cooling are required, the valve is actuated to allow coolant flow to the engine.

49 Claims, 3 Drawing Sheets

COOLANT MOTOR FAN DRIVE

Matter enclosed in heavy brackets [ ] appears in the original patent but forms no part of this reissue specification; matter printed in italics indicates the additions made by reissue.

TECHNICAL FIELD

The present invention relates generally to an engine cooling systems and more specifically to a coolant motor fan drive.

BACKGROUND ART

Generally, a water-cooling type engine of a vehicle includes a cooling system provided with a radiator and a flow control valve. The radiator is located in an engine coolant circuit for cooling the coolant. The flow control valve regulates the flow of the coolant that passes through the radiator. The flow control valve is controlled to change the coolant flow in the radiator (hereafter, "the radiator flow"). This adjusts the temperature of the coolant, which cools the engine.

The flow control valve is fully closed to minimize the radiator flow when the coolant temperature is relatively low. In contrast, when the coolant temperature is relatively high, the flow control valve is fully opened to maximize the radiator flow. Otherwise, a feedback control procedure is performed to vary the opening size of the flow control valve (the radiator flow) depending on the coolant temperature, such that the coolant temperature seeks a predetermined target.

To cool the coolant within the radiator, a cooling fan is mounted in close proximity to the radiator to providing cooling airflow to the radiator. Preferably, the cooling fan is coupled to the water pump.

However, many engine-cooling applications do not allow for conventional mounting of an engine-cooling fan on a water pump. For example, front wheel drive systems, or systems where the centerline of the water pump is not covered by the radiator, use electric motor driven systems or hydraulically driven fans to control the temperature of the coolant leaving the radiator. These systems are costly and inefficient.

Another potential issue related to cooling system performance is electrical power usage. As automotive manufacturers continue to introduce optional electrical equipment on automobiles, electrical demands within the vehicle correspondingly are increased. Further, customer demands for increased horsepower and towing capacity create additional demands on electrical systems. These extra demands place increased burdens on cooling systems to cool the engine compartment without significantly increasing electrical demand.

It is thus highly desirable to provide a way to cool an engine using an existing source of power that is economical and efficient.

SUMMARY OF THE INVENTION

The present invention utilizes an existing source of power, the coolant flow, and an economical water motor to drive an engine-cooling fan mounted to a water pump.

The control of the coolant flow is accomplished through valving or by adjusting the impeller rotational speed of the water pump, or a combination of both. Since the duty cycle of the cooling system is low, a clutch or recirculation path can be used when coolant flow or airflow requirements are low, thereby saving energy and providing an alternative control method.

During normal operation, where engine cooling is not required, the speed control coupling maintains a slow and constant water pump speed at all engine-operating speeds. The valve is maintained in a closed position and stops coolant flow from entering the radiator. Coolant is directed instead through a heater to maintain circulation and control hot spots and allow rapid engine warm-up.

If engine cooling is required, the valve is actuated and coolant is circulated to the engine and through the radiator and water motor at low pump speeds. The water motor and coupled fan are then actuated, thereby cooling the coolant as it flows through the radiator. If cooling requirements increase, the water pump is switched to high speed and the system operates at maximum heat rejection capacity.

When airflow for the air conditioner condenser is needed, the speed control coupling simply increases the water pump speed, and hence the fan speed. This can be controlled from air conditioner head pressure or simply actuated with the air conditioner compressor. Pilot pressure at the valve can direct coolant flow back to the pump by passing the engine and avoiding overcooling.

If both cooling and air conditioning are required, the pump speed coupling and the valve are both actuated to drive the fan at maximum speed and pump all the coolant through the engine.

In alternative preferred embodiments, because of the huge rpm range of some motors, a dual stage pump is used as either the water pump, water motor, or both the water pump and water motor. The dual stage pump allows for a more varying response between engine speed and pump/fan output.

Other objects and advantages of the present invention will become apparent upon the following detailed description and appended claims, and upon reference to the accompanying drawings.

DETAILED DESCRIPTION OF THE PREFERRED EMBODIMENT

Figure 1:
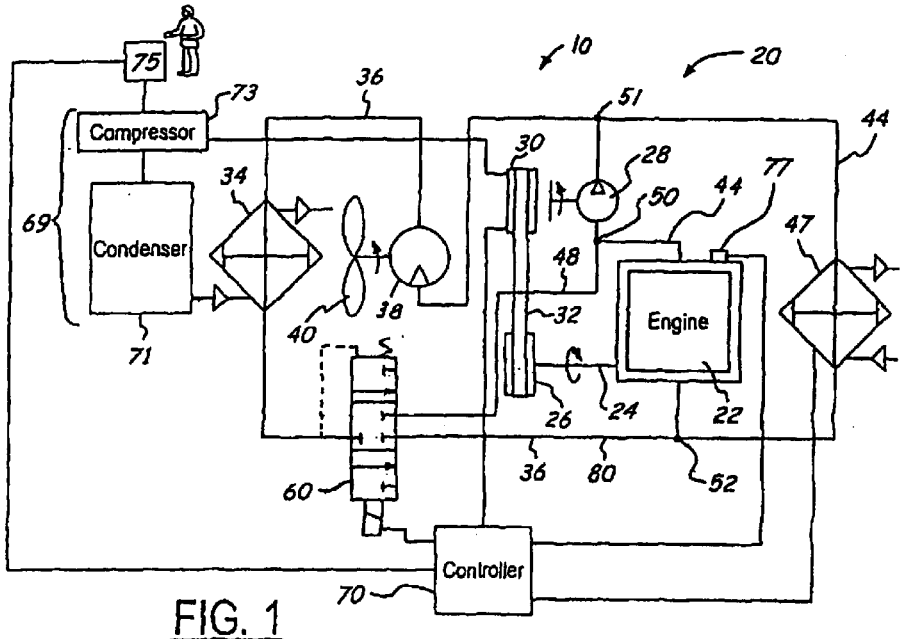
FIG. 1 is a perspective view of an engine cooling system according to a preferred embodiment of the present invention having a valve in a closed position.
Figure 2:
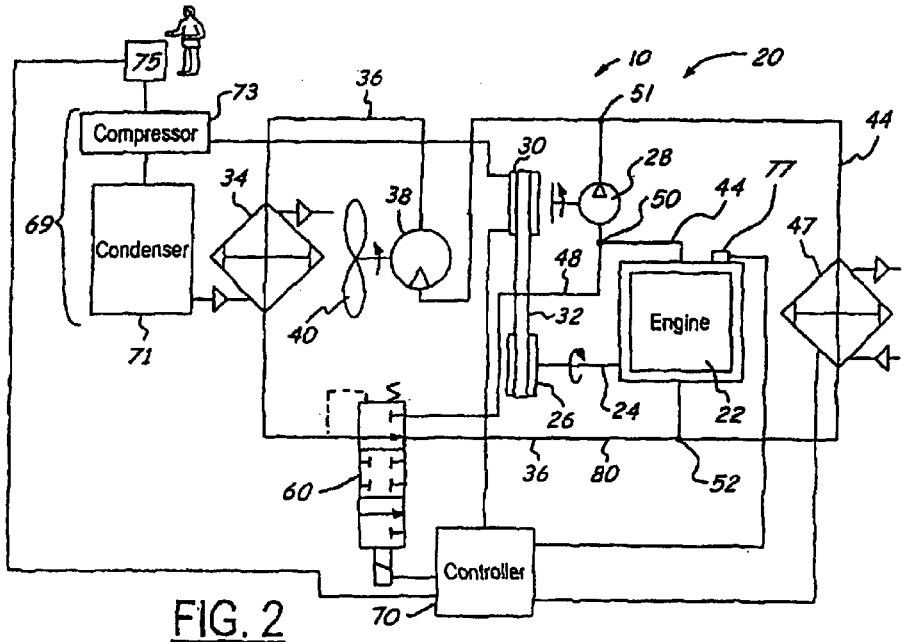
FIG. 2 is a perspective view of FIG. 1 in which the valve is in an open position.
Figure 3:
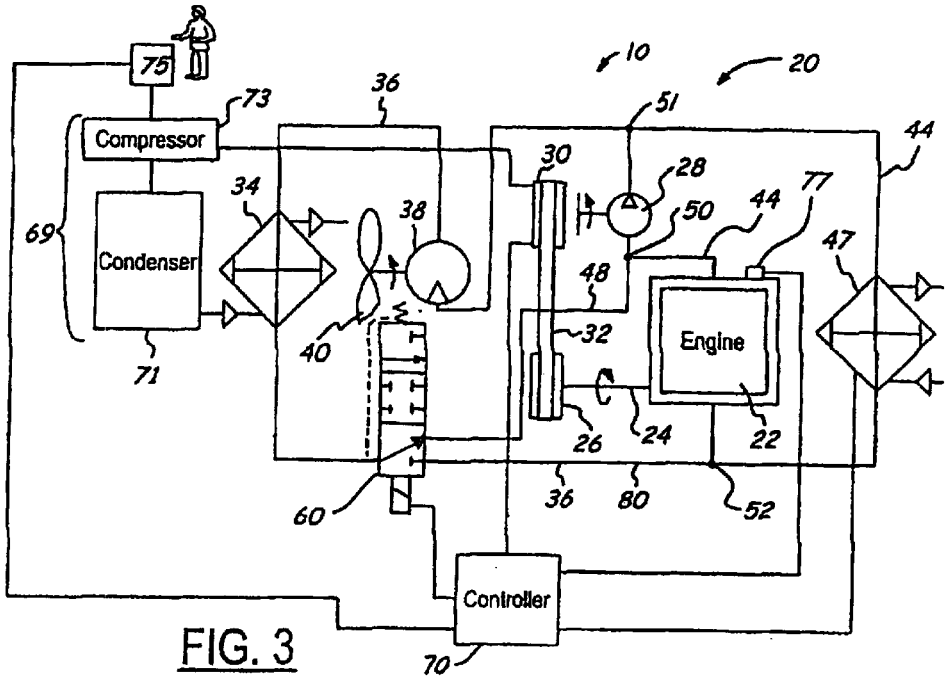
FIG. 3 is a perspective view of FIG. 1 in which the valve is in a third position.

Referring now to FIGS. 1–3, a perspective view of a cooling system used to cool an engine 22 of a vehicle 10 in one preferred embodiment is generally designated as 20. The engine 22 has a crankshaft 24 coupled to a crankshaft pulley 26. The crankshaft pulley 26 is rotatably coupled to a water pump 28 via a pump control coupling 30, which is coupled to the crankshaft pulley 26 via a belt 32. The cooling system 20 also has a heater element 47 used to increase the temperature of the engine 22 as desired and to provide heated air to the passenger cabin of the vehicle as desired by a vehicle user 75. The cooling system 20 also has an air-conditioning unit 69 providing cooling airflow to the passenger cabin as requested by the user 75.

The location of the user 75 relative to the heater element 47 and air conditioner 69, as shown in FIGS. 1–6 of the present invention, is merely for illustrative purpose only, and is not representative of their actual positioning within the vehicle 10.

The cooling system has a series of coolant lines 36, 44, 48 used to fluidically couple the various components of the cooling system 20 to maintain the engine 22 at an optimal operating temperature at a given engine speed while maintaining the passenger cabin at a desired temperature for the user 75.

The water pump 28 is fluidically coupled to a heater element 47 and to the engine 22 through a first coolant line 44. A second coolant line 36 is fluidically coupled to the first coolant line 44 at a first end, terminating at a first junction 51. The second coolant line is also fluidically coupled at its opposite end to the first coolant line 44, terminating at a second junction 52.

A water motor 38 having an attached fan 40 is fluidically coupled with the second coolant line 36 between radiator 34 and water pump 28. The fan 40 is coupled in such a way as to provide cooling airflow to the radiator 34 when rotating. A valve 60 coupled to the second coolant line 36 is located between the radiator 34 and second junction 52.

A third coolant line 48 is fluidically coupled to the second coolant line 36 through the valve 60 at one end and to the first coolant line 44 at junction 50 at a second end such that the third coolant line bypasses the engine 22.

Thus, the coolant lines 36, 44, 48 form a continuous closed loop and contain a quantity of coolant 80 there within that is used to warm up or cool down the engine 22 to maintain the engine 22 is a desired temperature operating zone.

The pump control coupling 30, also known as a speed control coupling 30, preferably takes the form of an on/off electric clutch or an electrically controlled viscous clutch well known to those of ordinary skill in the art. As such, the amount of rotational response of the coupled water pump 28 is controlled as a function of the degree of engagement of the pump control coupling 30.

The cooling system also has an air conditioner 69 including a condenser 71 and a compressor 73. The air conditioner 69 is controlled by a user 75 and is also electrically coupled to the controller 70. The condenser 71 is capable of receiving cooling airflow (ram flow) from outside air as the vehicle is moving.

The valve 60, heater element 47, air conditioner 69, and pump control coupling 30 are all electrically coupled to and controlled by a controller 70. In addition, at least one temperature sensor 77 is coupled to the controller 70 and measures the temperature of the engine 22 during operating conditions.

While one temperature sensor 77 is shown as being coupled to the engine 22 in FIGS. 1–3, the number and location of the temperature sensor 77 could vary greatly within cooling systems 20 and still accurately measure the engine operating temperature. For example, the temperature sensor 77 could be alternatively mounted to cooling line 44 between the engine 22 and junction 50. Further, multiple temperature sensors 77 located throughout the cooling system could all be coupled to the controller and used to accurately measure engine operating temperature. Thus, the number and location of temperature sensors 77 is not meant to be limited to that illustrated in FIGS. 1–3.

In warm-up conditions, as displayed in FIG. 1, wherein the engine 22 is operating below a desired operating temperature (as measured by the temperature sensor 77), the controller 70 will direct the valve 60 closed and the speed control coupling 30 to maintain a slow and constant water pump 28 speed. Thus coolant 80 will thus flow from the water pump 28, through first coolant line 44 and the heater element 47 and the engine 22, therein returning to the pump 28. This coolant 80 is warmed as is flow through the jeater element 47 to allow for rapid engine 22 warm-ups. However, because the coolant 80 is constantly flowing through the first coolant line 44, hot spots are eliminated on the engine 22. The controller 70 can also control the amount of heat exchanged to the coolant 80 within the heater element 47 by simply increasing or decreasing the temperature of the heater element 47 itself, or by slightly altering the rotational speed of the speed control coupling 30 (and water pump 28), or by a combination of pumping speed control and heater control.

As engine operating temperatures increase closer to, but still below, a desired engine operating temperature, the controller 70 will direct the speed coupling 30 to increase its rotational speed, therein increasing the rotational rate of the water pump 28 in response, which in turn increases the flow rate of coolant 80 as it flows through the water pump 28 and heater element 47. Thus, coolant 80 flows through the heater element 47 at a higher flow rate, which translates into less heat transfer per unit coolant 80. Thus, the engine 22 will continue to warm-up, but at a lesser relative rate.

At the desired engine operating temperature, as shown in FIG. 2, the controller 70 will direct the valve 60 to open, therein allowing coolant 80 to flow through the second coolant line 36 from the first junction 51 to the second junction 52. This coolant flow engages water motor 38 to drive fan 40, which provides cooling airflow to the radiator 34. Thus, as coolant 80 flows through the radiator 34, the coolant 80 is cooled in proportion to the coolant flow rate through the radiator and in proportion to the fan 40 rotational rate, which provides cooling air flow to the radiator 34 as the fan 40 is rotated by the water motor 38.

At the same time, coolant 80 flows from pump 28 and through the first coolant line 44. The cooler coolant 80 from second coolant line 36 merges with the warmer coolant 80 from the first coolant line 44 at junction 52 and continues to flows through the engine 22. Thus, the cooler coolant 80 flowing through the second coolant line 36 and the warmer coolant 80 flowing through the first coolant line 44 merge at junction 52 and flow together back through the engine 22 and line 44 to pump 28.

If engine temperatures increase over a desired engine operating temperature, the controller 70 simply directs the speed controller 30 to increase the water pump 28 speed, while maintaining the valve 60 in an actuated or open position. This in turn increases the water motor 38 speed, and hence the fan 40 rotational speed. The net effect is that more cooling airflow is directed to the radiator 34 from the fan 40, which decreases the coolant 80 temperature further. At the same time, coolant 80 flowing through line 44 and heater element 47 is not warmed as much as at slower pump speeds. Thus, as the pump speed 28 increases, merged coolant 80 flowing from junction 52 to engine 22 is cooler than at lower pump speeds, which in turn aids in cooling the engine 22 as the merged coolant 80 returns to the water pump 28 through coolant line 44.

When the user 75 desires air conditioning to cool the cabin area of the vehicle, the user 75 simply turns on the air conditioning 69 within the cabin of the vehicle. In order to accommodate this request, as shown in FIG. 3, cooling airflow for the air conditioning condenser 71 is needed to condense freon contained within the condenser 71 from a gas to a liquid. Pilot pressure generated within the compressor 73 as the air conditioner 69 is activated actuates the valve 60 to move from either a closed position or an open position to a second open position such that coolant may flow from line 36 through line 48 and back to the water pump 28. At the same time, coolant 80 flow from the second coolant line 36 between the valve 60 and junction 52 and to the engine 22 is prevented. Thus, coolant 80 flows through water motor 38, therein activating the fan 40 to provide additional cooling airflow to the radiator 34 and condenser 71. The coolant 80 exits the radiator 34 and returns to the water pump 28 through valve 60, third coolant line 48, junction 50, and first coolant line 44.

If additional cooling is desired, especially at idle conditions, the controller 70 will direct the speed coupling 30 to increase its rotational speed at a given engine speed, and hence the water pump 28 speed, which in turn increases the pumping speed of water motor 38 and rotational speed of the fan 40. This further increases airflow from the fan 40 to the air conditioner condenser 71.

If both engine cooling, as sensed by sensor 77, and air conditioning 69 is requested by the user 75, the controller 70 actuates the pump speed coupling 30 to produce maximum pumping action and directs the valve 60 from the second open position (or closed position, depending upon the pilot pressure within the compressor 73) to the first open position to provide coolant 80 flow back from the radiator 34 to the engine 22 through second line 36 to junction 52. This drives the fan 40 at maximum speed while allowing coolant 80 to pass through the line 36 and the junction 52 to the engine 22.

Figure 4:
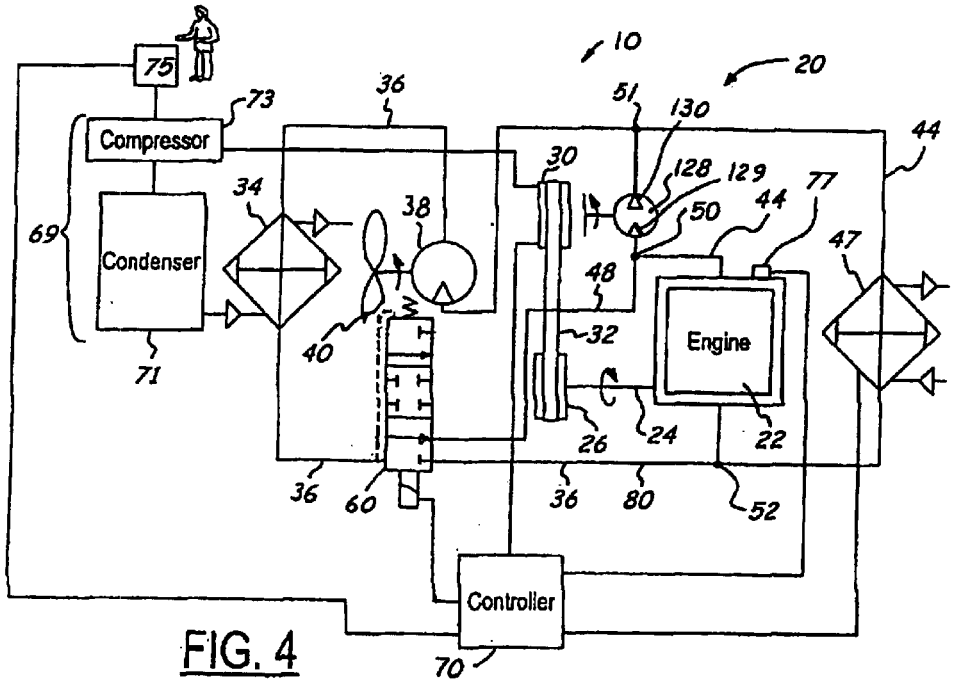
FIG. 4 is a perspective view of an engine cooling system according to another preferred embodiment of the present invention.
Figure 5:
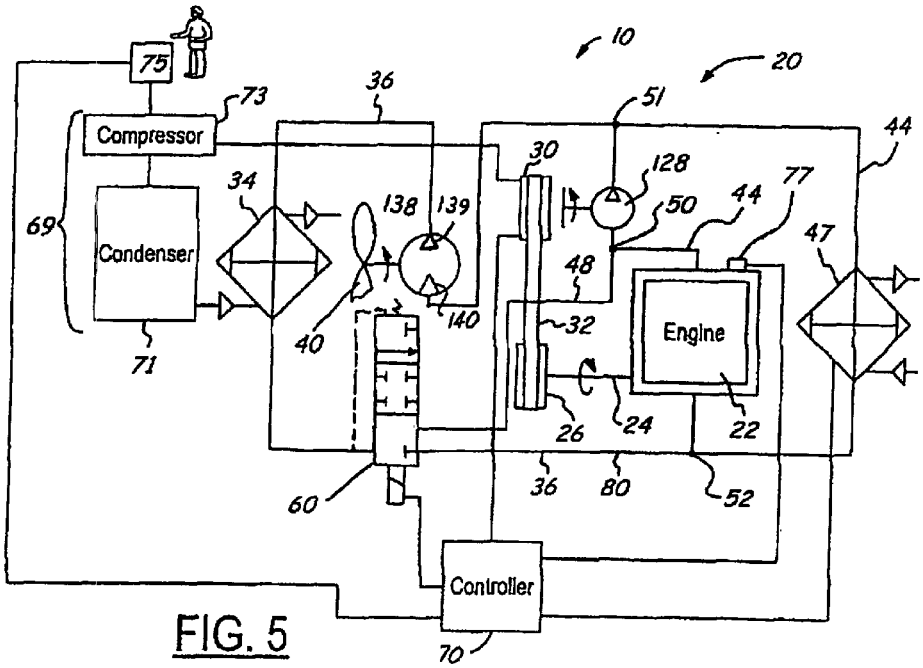
FIG. 5 is a perspective view of an engine cooling system according to another preferred embodiment of the present invention.
Figure 6:
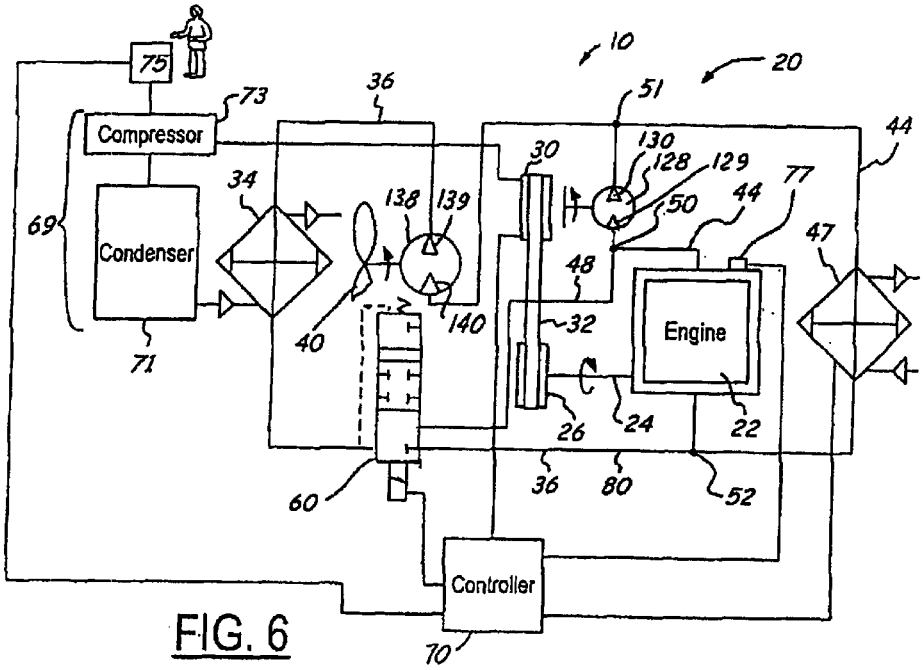
FIG. 6 is a perspective view of an engine cooling system according to another preferred embodiment of the present invention.

FIGS. 4–6 illustrate three more preferred embodiments of the present invention that are essentially useful for vehicle cooling systems in which the engines that they cool have a high range of potential engine speeds, especially as compared with idling conditions. For example, in FIG. 4, a dual stage water pump 128 is utilized in place of the single stage water pump 28 of FIGS. 1–3. In FIG. 5, a dual stage water motor 138 replaces the single stage water motor 38 of FIGS. 1–3. FIG. 6 incorporates a dual stage water pump 128 and a dual stage water motor 138.

A dual stage water pump 128, as shown in FIGS. 4 and 6, consists of a pair of independently actuated pumps 129, 130 (i.e. stages) coupled to the speed control coupling 30. Each pump 129, 130 is electrically coupled to the controller 70. Depending upon the desired coolant flow rate, one or both pumps may be actuated. When both pumps 129, 130 are actuated, the coolant flow rate increases as compared with the use of a single one of the two pumps. As such, the coolant flow rate can be adjusted stepwise in conjunction with the speed control coupling 30.

A dual stage water motor 138, as shown in FIGS. 5 and 6, consists of a pair of independently actuated water motors 139, 140 (i.e. stages) coupled to the speed control coupling 30. Each pump 139, 140 is electrically coupled to the controller 70. Depending upon the desired coolant 80 flow rate and fan 40 rotation rate, one or both pumps may be actuated. When both pumps 139, 140 are actuated, the coolant flow rate and fan 40 rotational rate increases as compared with the use of a single one of the two pumps. As such, the temperature and coolant flow rate of coolant flowing through the second line 36 can be adjusted stepwise in conjunction with the speed control coupling 30. This allows for more precise control of temperature of the coolant entering the engine when the valve 60 is in an open position. This can lead to improved fuel economy and emissions.

The dual stage nature of the water pump and water motor allows both stages to be working in conditions where maximum coolant flow is required, such as in engine idle conditions in which the engine is above the desired operating temperature. However, when the vehicle is moving, or when the vehicle is below the desired operating temperature, one of the stages may be turned off.

In addition, the dual stage nature is especially useful in engines having a high variation of engine speeds. Thus, for example, when low engine speeds are present, such as in engine idle, the water pump 128 can be directed to only utilize a single stage. As engine speeds increase, for example to 5000–6000 revolutions per minute (rpms), the second stage 130 may be activated. Thus, less horsepower is required to drive the speed coupling 30, and excess horsepower can be utilized elsewhere in the engine, therein increasing engine performance in terms of available horsepower, emissions, and fuel economy. Additionally, less electrical energy is needed to control the speed coupling 30.

With respect to FIG. 4, in warm-up conditions, wherein the engine 22 is operating below a desired operating temperature as measured by a temperature sensor 77, the controller 70 will direct the valve 60 closed and the speed control coupling 30 to maintain a slow and constant water pump 128 speed. In warm-up conditions, only one stage of the dual stage water pump 128 is on, therein limiting the coolant flow rate through line 44 and the heater element 47 to provide maximum warming of the coolant 80 within the heater element 47.

As engine operating temperatures increase closer to, but still below, a desired engine operating temperature, the controller 70 will direct the speed coupling 30 to increase its rotational speed, therein increasing the flow rate of coolant 80 through the water pump 128 and heater element 47. Alternatively, or in conjunction with increasing the rotational speed of the speed coupling 30, the controller 70 will turn on the second stage of the water pump, therein increasing the coolant 80 flow.

At the desired engine operating temperature, the controller 70 will direct the valve 60 to open, therein allowing coolant 80 to flow through second line 36 from the first junction 51 to the second junction 52. This engages water motor 38 to drive fan 40, which provides cooling airflow to the radiator 34. Thus, as coolant 80 flows through the radiator, the coolant is cooled. At the same time, coolant 80 flows from pump 128 and through first coolant line 44. The cooler coolant 80 from the second coolant line 36 merges with the warmer coolant 80 from the first coolant line 44 at junction 52. The merged coolant continues to flow through the first coolant line, 44 and back to the pump 128.

At the desired engine operating temperature, as the vehicle 10 is moving, one or both stages of the dual stage water pump 128 is on, therein controlling the coolant flow rate through both lines 36, 44. However, during engine idle conditions, only one stage of the dual stage water pump 128 is typically activated, therein decreasing the flow rate of coolant 80 through both lines 36, 44 to maintain the engine in a desired operating zone.

If engine temperatures increase over a desired engine operating temperature, the controller 70 simply directs the speed controller 30 to increase the water pump 128 speed while maintaining the valve 60 in an actuated position. Alternatively, or in conjunction with this speed increase, the controller 70 may actuate both stages of the water pump 128. This in turn increases the water motor 38 speed, and hence the fan 40 rotational speed. The net effect is that more cooling airflow is directed to the radiator 34 from the fan 40, which decreases the coolant 80 temperature further. Thus, as the pump speed 128 increases, coolant flowing from junction 52 is cooler than at lower pump speeds, which in turn aids in cooling the engine 22 as the coolant 80 returns to the water pump 128 through coolant line 44.

When the user 75 desires air conditioning to cool the cabin area of the vehicle 10, he simply turns on the air conditioning 69 within the cabin of the vehicle 10. As described above, the increase in pilot pressure actuates the valve 60 to allow coolant 80 flowing through the second coolant line 36 to bypass the engine 22 through junction 52 and flow instead through line 48 and back to the pump 128. The controller 70 simply directs the speed controller 30 to increase the water pump 128 speed, and hence the coolant flow, through the second coolant line 36 and third coolant line 48. Alternatively, or in conjunction with this speed increase, the controller 70 actuates one or both stages of the dual action pump.

If additional cooling is desired, especially at idle conditions, the controller 70 will direct the speed coupling 30 to increase its rotational speed and actuate dual stages, and hence the water pump 28 speed, which in turn increases the water motor 38 and fan speed 40. This further increases airflow from the fan 40 to the air conditioner condenser 71.

If both engine cooling, as sensed by sensor 77, and air conditioning is requested, the controller 70 actuates the pump speed coupling 30 to produce maximum pumping action, utilizing both stages of the dual stage pump 128, and opens valve 60 to provide coolant flow back from the radiator 34 to the engine 22 through coolant line 36 and junction 52. This drives the fan 40 at maximum speed while allowing the cooled portion of the coolant 80 to pass through the engine 22.

With respect to FIG. 5, in warm-up conditions, wherein the engine 22 is operating below a desired operating temperature as measured by a temperature sensor 77, the controller 70 will direct the valve 60 closed and the speed control coupling 30 to maintain a slow and constant water pump 28 speed, therein limiting the coolant flow rate through line 44 and the heater element 47 to provide maximum warming of the coolant 80 within the heater element 47.

As engine operating temperatures increase closer to, but still below, a desired engine operating temperature, the controller 70 will direct the speed coupling 30, and hence the water pump 28 rotational speed, therein increasing the flow rate of coolant 80 through the water pump 28 and heater element 47.

At the desired engine operating temperature, the controller 70 will direct the valve 60 to open, therein allowing coolant 80 to flow through second line 36 from the first junction 51 to the second junction 52. This engages the dual stage water motor 138 to drive fan 40, which provides cooling airflow to the radiator 34. Thus, as coolant 80 flows through the radiator 34, the coolant 80 is cooled. At the same time, coolant 80 flows from pump 28 and through first coolant line 44. The cooler coolant 80 from the second coolant line 36 merges with the warmer coolant 80 from the first coolant line 44 at junction 52. The merged coolant continues to flow through the first coolant line 44 and back to the pump 28.

To precisely control the amount of cooling of the coolant occurring in the radiator, the controller may direct on one or both stages 139, 140 of the water motor. The rotational rate of the fan 40 is greater, and hence the amount of airflow to the radiator 34, at a given pump 28 speed, when both stages 139, 140 are actuated. The incorporation of a dual stage water motor 138 allows different cooling characteristics to be achieved for coolant 80 returning to the engine 22 through junction 52, hence the merged coolant will be cooler if both stages 139, 140 are actuated and slightly warmer if only one stage 139 is used.

If engine temperatures increase over a desired engine operating temperature, the controller 70 simply directs the speed controller 30 to increase the water pump 28 speed while maintaining the valve 60 in an actuated position. Alternatively, or in conjunction with this speed increase, the controller 70 may actuate both stages 139, 140 of the water pump 128. This in turn increases the water motor 38 speed, and hence the fan 40 rotational speed, as compared with one stage 139 being actuated. The net effect is that more cooling airflow is directed to the radiator 34 from the fan 40, which decreases the coolant 80 temperature further. Thus, as the pump speed 28 increases, coolant flowing from junction 52 is cooler than at lower pump speeds, which in turn aids in cooling the engine 22 as the coolant 80 returns to the water pump 128 through coolant line 44.

When the user 75 desires air conditioning to cool the cabin area of the vehicle 10, he simply turns on the air conditioning 69 within the cabin of the vehicle 10. As described above, the increase in pilot pressure actuates the valve 60 to allow coolant 80 flowing through the second coolant line 36 to bypass the engine 22 through junction 52 and flow instead through line 48 and back to the pump 128. The controller 70 simply directs the speed controller 30 to increase the water pump 28 speed, and hence the coolant flow, through the second coolant line 36 and third coolant line 48.

If both engine cooling, as sensed by sensor 77, and air conditioning 69 is requested, the controller 70 actuates the pump speed coupling 30 to produce maximum pumping action by the pump 28, and opens valve 60 to provide coolant flow back from the radiator 34 to the engine 22 through coolant line 36 and junction 52. The controller 70 will also direct one or both stages 139, 140 of the water motor 138 to drive the drives the fan 40 at the desired rotational speed while allowing the cooled portion of the coolant 80 to pass through the engine 22, and not bypass the engine 22 through line 48.

With respect to FIG. 6, in warm-up conditions, wherein the engine 22 is operating below a desired operating temperature as measured by a temperature sensor 77, the controller 70 will direct the valve 60 closed and the speed control coupling 30 to maintain a slow and constant water pump 128 speed. In warm-up conditions, only one stage of the dual stage water pump 128 is on, therein limiting the coolant flow rate through line 44 and the heater element 47 to provide maximum warming of the coolant 80 within the heater element 47.

As engine operating temperatures increase closer to, but still below, a desired engine operating temperature, the controller 70 will direct the speed coupling 30 to increase its rotational speed, therein increasing the flow rate of coolant 80 through the water pump 128 and heater element 47. Alternatively, or in conjunction with increasing the rotational speed of the speed coupling 30, the controller 70 will turn on the second stage 130 of the water pump 128, therein increasing the coolant 80 flow.

At the desired engine operating temperature, the controller 70 will direct the valve 60 to open, therein allowing coolant 80 to flow through second line 36 from the first junction 51 to the second junction 52. This engages water motor 138 to drive fan 40, which provides cooling airflow to the radiator 34. Thus, as coolant 80 flows through the radiator, the coolant 80 is cooled. At the same time, coolant 80 flows from pump 128 and through first coolant line 44. The cooler coolant 80 from the second coolant line 36 merges with the warmer coolant 80 from the first coolant line 44 at junction 52. The merged coolant continues to flow through the first coolant line 44 and back to the pump 128. Depending upon the characteristics of the engine 22, one or both stages 139, 140 of the water motor 138 may be actuated by the controller 70.

At the desired engine operating temperature, as the vehicle 10 is moving, one or both stages of the dual stage water pump 128 is on, therein controlling the coolant flow rate through both lines 36, 44. However, during engine idle conditions, only one stage of the dual stage water pump 128 is typically activated, therein decreasing the flow rate of coolant 80 through both lines 36, 44 to maintain the engine in a desired operating zone. Also, one or both stages 139, 140 of the water motor are activated to further regulate the temperature of the coolant 80 flowing through line 36 and back to the engine 22.

If engine temperatures increase over a desired engine operating temperature, the controller 70 simply directs the speed controller 30 to increase the water pump 128 speed while maintaining the valve 60 in an actuated position. Alternatively, or in conjunction with this speed increase, the controller 70 may actuate both stages 129, 130 of the water pump 128. This in turn increases the water motor 138 speed, and hence the fan 40 rotational speed. The net effect is that more cooling airflow is directed to the radiator 34 from the fan 40, which decreases the coolant 80 temperature further. Thus, as the pump speed 128 increases, coolant 80 flowing from junction 52 is cooler than at lower pump speeds, which in turn aids in cooling the engine 22 as the coolant 80 returns to the water pump 128 through coolant line 44. Typically, both stages 139, 140 of the dual stage water motor 138 will be actuated by the controller 70 to provide maximum fan 40 rotational speed to cool the coolant 80 as it flows through the radiator 34.

When the user 75 desires air conditioning to cool the cabin area of the vehicle 10, he simply turns on the air conditioning 69 within the cabin of the vehicle 10. As described above, the increase in pilot pressure actuates the valve 60 to allow coolant 80 flowing through the second coolant line 36 to bypass the engine 22 through junction 52 and flow instead through line 48 and back to the pump 128. The controller 70 simply directs the speed controller 30 to increase the water pump 128 speed, and hence the coolant flow, through the second coolant line 36 and third coolant line 48. Alternatively, or in conjunction with this speed increase, the controller 70 actuates one or both stages 129, 130 of the dual action pump 128 and/or one or both stages 139, 140 of the water motor 138.

If additional cooling is desired, especially at idle conditions, the controller 70 will direct the speed coupling 30 to increase its rotational speed and actuate dual stages 129, 130 of the water pump 128, and hence the water pump 128 speed, which in turn increases the water motor 138 and fan speed 40. This further increases airflow from the fan 40 to the air conditioner condenser 71. Also, typical both stages 139, 140 of the water motor are activated to further decrease the temperature of the coolant 80 flowing through line 36 and back to the engine 22.

If both engine cooling, as sensed by sensor 77, and air conditioning 69 are requested, the controller 70 actuates the pump speed coupling 30 to produce maximum pumping action, utilizing both stages 129, 130 of the dual stage pump 128, and open valve 60 to provide coolant flow back from the radiator 34 to the engine 22 through coolant line 36 and junction 52. Also, typically both stages 139, 140 of the water motor are activated to provide maximum fan 40 rotational speed to further decrease the temperature of the coolant 80 flowing through line 36 and back to the engine 22.

While one particular embodiment of the invention have been shown and described, numerous variations and alternative embodiments will occur to those skilled in the art. Accordingly, it is intended that the invention be limited only in terms of the appended claims.

What is claimed is:

1. A cooling system for an engine, the cooling system comprising:

a first coolant line coupled to the engine;

a heater element coupled to said first coolant line;

a second coolant line fluidically coupled to said first coolant line at a first end and a second end, wherein said first coolant line and said second coolant line form a continuous closed loop;

a quantity of coolant contained within said continuous closed loop;

a radiator fluidically coupled to said second coolant line between said first end and said second end;

a water pump fluidically coupled within said first coolant line and rotatably coupled to said engine;

a water motor fluidically coupled to said second coolant line between said first end and said second end;

a fan coupled to said water motor,said fan rotating to cool said radiator as a function of the flow rate of said quantity of coolant through said water motor;

a valve fluidically coupled to said second coolant line, said valve having an open position and a closed position, said closed position preventing flow of said quantity of coolant through said second coolant line and said open position allowing flow of said quantity of coolant through said second coolant line;

a pump control coupling coupled to said pump, said pump control coupling controlling the rotational rate of said water pump and said water pump impellers to pump said quantity of coolant through said second coolant line;

a belt coupled to said crankshaft pulley and said pump control coupling;

at least one temperature sensor capable of measuring engine operating temperature; and a controller electrically coupled to said valve and electrically coupled to said speed control coupling and electrically coupled to said at least one temperature sensor, said controller controlling the actuation of said valve and controlling the rotational rate of said speed control coupling as a function of said measured engine operating temperature.

2. The cooling system of claim 1, wherein said water pump comprises a dual stage water pump.

3. The cooling system of claim 1, wherein said water motor comprises a dual stage water motor.

4. The cooling system of claim 1 further comprising:

a third coolant line fluidically coupled to said first coolant line and said second coolant line, wherein said first coolant line, said second coolant line and said third coolant line form a continuous closed loop;

an air conditioning unit coupled to said controller, said air conditioning unit having a compressor, said compressor coupled near said fan and capable of receiving air flow from said fan as said fan is rotated;

wherein said compressor is coupled to said valve, wherein pilot pressure generated within said compressor when said air conditioner is actuated is capable of moving said valve to a second open position, said second open position allowing coolant flow through said third coolant line while preventing coolant flow through said second coolant line.

5. The cooling system of claim 1, wherein said speed control coupling comprises an on/off clutch.

6. The cooling system of claim 1, wherein said speed control coupling comprises an electronically controlled viscous coupling.

7. A method for controlling the temperature of an engine at a current engine speed, the method comprising:

(a) providing a cooling system comprising:

a first coolant line coupled to the engine;

a heater element coupled to said first coolant line;

a second coolant line fluidically coupled to said first coolant line at a first end and a second end; wherein said first coolant line and said second coolant line form a continuous closed loop;

a quantity of coolant contained within said continuous closed loop;

a radiator fluidically coupled to said second coolant line between said first end and said second end;

a water pump fluidically coupled within said first coolant line and rotatably coupled to said engine;

a water motor fluidically coupled to said second coolant line between said first end and said second end;

a fan coupled to said water motor, said fan rotating to cool said radiator as a function of the flow rate of said quantity of coolant through said water motor;

a valve fluidically coupled to said second coolant line, said valve having an open position and a closed position;

a pump control coupling coupled to said pump, said pump control coupling controlling the rotational rate of said water pump and said water pump impellers to pump said quantity of coolant through said second coolant line;

a belt coupled to said crankshaft pulley and said pump control coupling;

at least one temperature sensor capable of measuring engine operating temperature; and a controller electrically coupled to said valve and electrically coupled to said speed control coupling and electrically coupled to said at least one temperature sensor;

(b) determining an engine operating temperature at the current engine speed using said at least one temperature sensor;

(c) determining a desired operating temperature for the engine at the current engine speed; and (d) controlling the actuation of said valve between said closed position and said open position and controlling the rotational rate of said speed control coupling using said controller to change said engine operating temperature to said desired operating temperature at the current engine speed.

8. The method of claim 7, wherein (d) further comprises controlling the rotational rate of said speed control coupling using said controller to change said engine operating temperature to said desired operating temperature at the current engine speed.

9. The method of claim 7, wherein (d) controlling the actuation comprises (d) decreasing said engine operating temperature to said desired operating temperature by actuating said valve to said open position to allow coolant to flow through said second coolant line.

10. The method of claim 8, wherein (d) controlling the actuation comprises (d) decreasing said engine operating temperature to said desired operating temperature by increasing the rotational rate of said speed control coupling.

11. The method of claim 8, wherein (d) controlling the actuation comprises:

decreasing said engine-operating temperature to said desired operating temperature by actuating said valve to said open position to allow coolant to flow through said second coolant line; and increasing the rotational rate of said speed control coupling at the current engine speed.

12. A method for controlling the temperature of an engine at a current engine speed having an actuated air-conditioning unit, the air-conditioning unit having a compressor and a condenser, the method comprising:

(a) providing a cooling system comprising:

a first coolant line coupled to the engine;

a heater element coupled to said first coolant line;

a second coolant line fluidically coupled to said first coolant line at a first end and a second end wherein said first coolant line and said second coolant line form a continuous closed loop;

a third coolant line fluidically coupled to said first coolant line and said second coolant line, wherein said first coolant line, said second coolant line and said third coolant line form a continuous closed loop;

a quantity of coolant contained within said continuous closed loop;

a radiator fluidically coupled to said second coolant line between said first end and said second end;

a water pump fluidically coupled within said first coolant line and rotatably coupled to said engine;

a water motor fluidically coupled to said second coolant line between said first end and said second end;

a fan coupled to said water motor, said fan rotating to cool said radiator and said condenser as a function of the flow rate of said quantity of coolant through said water motor;

a valve fluidically coupled to said second coolant line and to said third coolant line, said valve having a first open position, a second open position and a closed position, wherein said valve moves from either said first open position or said closed position to said second open position when said pilot pressure within the compressor reaches a threshold pressure level after the air-conditioner is actuated;

a pump control coupling coupled to said pump, said pump control coupling controlling the rotational rate of said water pump and said water pump impellers to pump said quantity of coolant through said second coolant line;

a belt coupled to said crankshaft pulley and said pump control coupling;

at least one temperature sensor capable of measuring engine operating temperature; and a controller electrically coupled to said valve, said speed control coupling, said at least one temperature sensor and the air-conditioning unit;

(b) determining an engine operating temperature at the current engine speed using said at least one temperature sensor;

(c) determining a desired operating temperature for the engine at the current engine speed; and (d) controlling the actuation of said valve between said second open position and said first open position to change said engine operating temperature to said desired operating temperature at the current engine speed.

13. The method of claim 11, wherein (d) further comprises controlling the rotational rate of said speed control coupling using said controller to change said engine operating temperature to said desired operating temperature at the current engine speed.

14. The method of claim 11, wherein (d) controlling the actuation comprises (d) decreasing said engine operating temperature to said desired operating temperature by actuating said valve from said second open position to said first open position to allow coolant to flow through said second coolant line.

15. The method of claim 14, further comprising increasing the rotational rate of said speed control coupling.

16. The method of claim 13, wherein (d) controlling the actuation comprises:

(d) decreasing said engine-operating temperature to said desired operating temperature by actuating said valve to said open position to allow coolant to flow through said second coolant line; and increasing the rotational rate of said speed control coupling at the current engine speed.

17. The method of claim 13, wherein (d) controlling the actuation comprises:

(d) increasing the engine-operating temperature to said desired operating temperature by maintaining said valve in said second open position to allow coolant to bypass said second coolant line between said valve and said second end.

18. A method for controlling the temperature of an engine at a current engine speed, the method comprising:

(a) providing a cooling system comprising:

a first coolant line coupled to the engine;

a heater element coupled to said first coolant line;

a second coolant line fluidically coupled to said first coolant line at a first end and a second end; wherein said first coolant line and said second coolant line form a continuous closed loop;

a quantity of coolant contained within said continuous closed loop;

a radiator fluidically coupled to said second coolant line between said first end and said second end;

a dual stage water pump fluidically coupled within said first coolant line and rotatably coupled to said engine, said dual stage pump comprising a pair of independently actuated pumps;

a water motor fluidically coupled to said second coolant line between said first end and said second end;

a fan coupled to said water motor, said fan rotating to cool said radiator as a function of the flow rate of said quantity of coolant through said water motor;

a valve fluidically coupled to said second coolant line, said valve having an open position and a closed position;

a pump control coupling coupled to said pump, said pump control coupling controlling the rotational rate of said water pump and said water pump impellers to pump said quantity of coolant through said second coolant line;

a belt coupled to said crankshaft pulley and said pump control coupling;

at least one temperature sensor capable of measuring engine operating temperature; and a controller electrically coupled to said valve, said speed control coupling, said at least one temperature sensor, and to each of said pair of individually actuated pumps comprising said dual stage water pump;

(b) determining an engine operating temperature at the current engine speed using said at least one temperature sensor;

(c) determining a desired operating temperature for the engine at the current engine speed;

(d) controlling the actuation of said valve between said closed position and said first open position to change said engine operating temperature to said desired operating temperature at the current engine speed;

(e) controlling the rotational rate of said speed control coupling using said controller to change said engine operating temperature to said desired operating temperature at the current engine speed; and (f) controlling the actuation of said dual stage water pump using said controller to change said engine operating temperature to said desired operating temperature at the current engine speed.

19. The method of claim 18, wherein (d) controlling the actuation comprises (d) decreasing said engine operating temperature to said desired operating temperature by actuating said valve to said open position using said controller, therein allowing said quantity of coolant to flow through said second coolant line.

20. The method of claim 19, wherein (e) controlling the actuation comprises (e) decreasing said engine operating temperature to said desired operating temperature by increasing the rotational rate of said speed control coupling.

21. The method of claim 19, wherein (f) controlling the actuation of said dual stage water pump comprises (f) decreasing said engine operating temperature to said desired operating temperature by actuating at least one of said pair of independently actuated pumps.

22. The method of claim 19, wherein (f) controlling the actuation of said dual stage water pump comprises (f) decreasing said engine operating temperature to said desired operating temperature by actuating each of said pair of independently actuated pumps.

23. The method of claim 18, wherein (d) controlling the actuation comprises (d) increasing said engine operating temperature to said desired operating temperature by actuating said valve to said closed position using said controller, therein preventing said quantity of coolant to flow through said second coolant line.

24. The method of claim 23, wherein (e) controlling the actuation comprises (e) increasing said engine operating temperature to said desired operating temperature by increasing the rotational rate of said speed control coupling.

25. The method of claim 23, wherein (f) controlling the actuation of said dual stage water pump comprises (f) increasing said engine operating temperature to said desired operating temperature by actuating at least one of said pair of independently actuated pumps.

26. The method of claim 23, wherein (f) controlling the actuation of said dual stage water pump comprises (f) increasing said engine operating temperature to said desired operating temperature by actuating each of said pair of independently actuated pumps.

27. The method of claim 18, wherein said water motor comprises a dual stage water motor electrically coupled to said controller, said dual stage water motor comprising a pair of independently actuated water motors.

28. The method of claim 27, wherein (d) controlling the actuation comprises (d) decreasing said engine operating temperature to said desired operating temperature by actuating said valve to said open position using said controller, therein allowing said quantity of coolant to flow through said second coolant line.

29. The method of claim 28, wherein (e) controlling the actuation comprises (e) decreasing said engine operating temperature to said desired operating temperature by increasing the rotational rate of said speed control coupling.

30. The method of claim 28, wherein (f) controlling the actuation of said dual stage water pump comprises (f) decreasing said engine operating temperature to said desired operating temperature by actuating at least one of said pair of independently actuated pumps.

31. The method of claim 28, wherein (f) controlling the actuation of said dual stage water pump comprises (f) decreasing said engine operating temperature to said desired operating temperature by actuating each of said pair of independently actuated pumps.

32. The method of claim 28, further comprising:

(g) decreasing said engine-operating temperature to said desired temperature by actuating at least one of said pair of independently actuated water motors.

33. The method of claim 28, further comprising:

(g) decreasing said engine-operating temperature to said desired temperature by actuating each of said pair of independently actuated water motors.

34. The method of claim 33, wherein (f) controlling the actuation of said dual stage water pump comprises (f) decreasing said engine operating temperature to said desired operating temperature by actuating at least one of said pair of independently actuated pumps.

35. The method of claim 33, wherein (f) controlling the actuation of said dual stage water pump comprises (f) decreasing said engine operating temperature to said desired operating temperature by actuating each of said pair of independently actuated pumps.

36. The method of claim 27, wherein (d) controlling the actuation comprises (d) increasing said engine operating temperature to said desired operating temperature by actuating said valve to said closed position using said controller, therein preventing said quantity of coolant to flow through said second coolant line.

37. The method of claim 36, wherein (e) controlling the actuation comprises (e) increasing said engine operating temperature to said desired operating temperature by increasing the rotational rate of said speed control coupling.

38. The method of claim 36, wherein (f) controlling the actuation of said dual stage water pump comprises (f) increasing said engine operating temperature to said desired operating temperature by actuating at least one of said pair of independently actuated pumps.

39. The method of claim 36, wherein (f) controlling the actuation of said dual stage water pump comprises (f) increasing said engine operating temperature to said desired operating temperature by actuating each of said pair of independently actuated pumps.

40. A method for controlling the temperature of an engine at a current engine speed, the method comprising:

(a) providing a cooling system comprising:

a first coolant line coupled to the engine;

a heater element coupled to said first coolant line;

a second coolant line fluidically coupled to said first coolant line at a first end and a second end; wherein said first coolant line and said second coolant line form a continuous closed loop;

a quantity of coolant contained within said continuous closed loop;

a radiator fluidically coupled to said second coolant line between said first end and said second end;

a water pump fluidically coupled within said first coolant line and rotatably coupled to said engine;

a dual stage water motor fluidically coupled to said second coolant line between said first end and said second end, said dual stage water motor comprising a pair of independently actuated water motors;

a fan coupled to said dual stage water motor, said fan rotating to cool said radiator as a function of the flow rate of said quantity of coolant through said pair of independently actuated water motors;

a valve fluidically coupled to said second coolant line, said valve having an open position and a closed position;

a pump control coupling coupled to said pump, said pump control coupling controlling the rotational rate of said water pump and said water pump impellers to pump said quantity of coolant through said second coolant line;

a belt coupled to said crankshaft pulley and said pump control coupling;

at least one temperature sensor capable of measuring engine operating temperature; and a controller electrically coupled to said valve, said speed control coupling, said at least one temperature sensor, and to each of said pair of individually actuated pumps comprising said dual stage water pump;

(b) determining an engine operating temperature at the current engine speed using said at least one temperature sensor;

(c) determining a desired operating temperature for the engine at the current engine speed;

(d) controlling the actuation of said valve between said closed position and said first open position to change said engine operating temperature to said desired operating temperature at the current engine speed;

(e) controlling the rotational rate of said speed control coupling using said controller to change said engine operating temperature to said desired operating temperature at the current engine speed;

(f) controlling the actuation of said water pump using said controller to change said engine operating temperature to said desired operating temperature at the current engine speed; and (g) controlling said engine-operating temperature to said desired temperature by actuating at least one of said pair of independently actuated water motors.

41. The method of claim 40, wherein (d) controlling the actuation comprises (d) decreasing said engine operating temperature to said desired operating temperature by actuating said valve to said open position using said controller, therein allowing said quantity of coolant to flow through said second coolant line.

42. The method of claim 40, wherein (e) controlling the actuation comprises (e) decreasing said engine operating temperature to said desired operating temperature by increasing the rotational rate of said speed control coupling.

43. The method of claim 40, wherein (d) controlling the actuation comprises (d) increasing said engine operating temperature to said desired operating temperature by actuating said valve to said closed position using said controller, therein preventing said quantity of coolant to flow through said second coolant line.

44. The method of claim 43, wherein (e) controlling the actuation comprises (e) increasing said engine operating temperature to said desired operating temperature by increasing the rotational rate of said speed control coupling.

45. The method of claim 40, wherein (d) controlling the actuation comprises (d) decreasing said engine operating temperature to said desired operating temperature by actuating said valve to said open position using said controller, therein allowing said quantity of coolant to flow through said second coolant line.

46. The method of claim 40, wherein (e) controlling the actuation comprises (e) decreasing said engine operating temperature to said desired operating temperature by increasing the rotational rate of said speed control coupling.

47. The method of claim 40, wherein (g) controlling said engine-operating temperature to said desired temperature by actuating at least one of said pair of independently actuated water motors comprises:

(g) decreasing said engine-operating temperature to said desired temperature by actuating each of said pair of independently actuated water motors.

48. The method of claim 40, wherein (d) controlling the actuation comprises (d) increasing said engine operating temperature to said desired operating temperature by actuating said valve to said closed position using said controller, therein preventing said quantity of coolant to flow through said second coolant line.

49. The method of claim 48, wherein (e) controlling the actuation comprises (e) increasing said engine operating temperature to said desired operating temperature by increasing the rotational rate of said speed control coupling.

* * * * *